United States Patent
Hamburg

[19]

[11] Patent Number: 5,905,506
[45] Date of Patent: May 18, 1999

[54] SHARED TILE IMAGE REPRESENTATIONS

[75] Inventor: Mark Hamburg, Scotts Valley, Calif.

[73] Assignee: Adobe Systems Incorporated, San Jose, Calif.

[21] Appl. No.: 08/702,941

[22] Filed: Aug. 26, 1996

[51] Int. Cl.$^6$ .................................................. G06F 15/00
[52] U.S. Cl. .......................................................... 345/438
[58] Field of Search ................................... 345/433, 438, 345/474, 121

[56] References Cited

U.S. PATENT DOCUMENTS

| | | | |
|---|---|---|---|
| 5,442,739 | 8/1995 | Saito ........................................ | 395/138 |
| 5,522,021 | 5/1996 | Huang et al. ........................... | 395/138 |

OTHER PUBLICATIONS

Blatner, David et al., *Real World Photoshop 3 Industrial Strength Production Techniques*, pp. 453–455 (1996).
FITS Imaging et al., *Live Picture*, pp. 108–111 (1994).
Wolberg, George, *Digital Image Warping*, pp. 52–56, 214–219 (1990).
Meyers, Scott, *More Effective C++*, pp. 190–194 (1996).

*Primary Examiner*—Phu K. Nguyen
*Attorney, Agent, or Firm*—Fish & Richardson P.C.

[57] ABSTRACT

A system for providing a "copy on write" function for images represented as tiles such that creation of a new "target" version of an existing "source" image is performed by (1) allocating memory for a set of target image tiles corresponding to the tiles in the source image; and (2) using a special flag associated with each of the tiles of the target image to indicate a linkage (directly or indirectly) between corresponding tiles in the source image and the target image until such time as changes are made in the target image tiles or the target image is to be finalized. The invention eliminates or substantially reduces the amount of copying of data required to generate a new version of an existing image, and provides for an easy means for "undoing" an operation on the user-perceived image by swapping references to internal images, while conserving the use of memory and storage.

9 Claims, 4 Drawing Sheets

SHARED TILE IMAGE REPRESENTATIONS

BACKGROUND OF THE INVENTION

1. Field of the Invention

This invention relates to electronic computer systems, and more particularly to methods and apparatus for processing large images.

2. Description of Related Art

One use of computers is to manipulate graphical images, such as photographs, line drawings, etc. Frequently, such images are too large to fit into memory (as opposed to storage) at once. Accordingly, it is known to break such images into grids of subimages, commonly referred to as image tiles or simply "tiles", and manipulate one or a few tiles at a time within memory, swapping out from storage for other tiles as necessary. A grid of tiles may be of any size N×M, including 1×M, or N×1, in which case each tile is a strip across an image. Tiles can be of any shape that can be used to cover a 2-dimensional area and need not all be the same shape or size. For example, tiles can be hexagons in a "honeycomb" grid. Conventionally, however, rectangular tiles arranged in a regular rectangular grid are used for ease of manipulation.

In conventional implementations, a tiled image is represented by two components: some basic geometric information describing the bounds of the image and the arrangement of the tiles (the tiling geometry), and a tile array containing a tile ID for every tile in the image. A tile array can be any data structure used for mapping a tile index (determined based on the tiling geometry) to a tile ID.

FIG. 1 shows an example of a two-by-two grid of four tiles 2, designated "a", "b", "c", and "d", containing the tile pixel data for the tiled image. Each tile comprises n×m pixels. In FIG. 1, tile "a" is in memory, while tiles "b", "c", and "d" (shown as hatched) are in storage. Accordingly, while all four tiles 2 may be required to depict an object 3 in the image, only part of the image would be accessible in memory at any one time. Also shown is a data structure 4 defining the tiled image, comprising a tile array 6, having indices 1, 2, 3, and 4 corresponding to tiles "a", "b", "c", and "d", respectively, based on a data structure 8 defining the tiling geometry. Data structures equivalent to a tile array, such as linked lists, trees, tables, etc., can also be used.

In conventional implementations, tile IDs are mapped to tile control records. This mapping may be based on either a direct address mapping (i.e., the IDs are pointers) or the tile IDs may be indices into another data structure. Tile control records contain whatever information is necessary for tracking the storage location(s) of the tile pixel data for the particular image tile. Thus, tiled images are represented using tile arrays which contain tile IDs which refer to tile control records which lead to tile pixel data.

Returning to the example if FIG. 1, the tile array 6 associated with the tiled image 2 can be used to translate the indices into tile IDs which correspond to particular tile control records which lead to tile pixel data. Under the terms defined above, we can say that the tile array 6 maps index 1 to image tile "a", and mean that the tile array 6 maps index 1 to the tile ID which leads to the tile control record which leads to the tile pixel data for image tile "a". (In FIG. 1, the tile control blocks are represented as merged with the pixel data in large rectangles. The linkages between tile array 6 elements and pixel data are indicated by arrows.)

The mapping from tile IDs to tile control records is injective—i.e., there is at most one tile ID for any given tile control record. (Generally, it is surjective as well, in that tile control records without tile IDs are useless.) The mapping from tile control records to pixel data is also injective in that no two tile control records refer to the same pixel data. Thus, there is essentially a one-to-one correspondence between tile IDs, tile control records, and tile pixel data. We will therefore take the liberty of referring simply to an image tile when we do not care about the individual pieces of this trio.

To find the value for a pixel within an image stored in a tiled representation, the image tile containing the desired pixel must be determined, then the location of the pixel within that tile must be determined. A conventional way for determining the coordinates of a pixel involves the following steps:

1. Determine the index of the tile containing the pixel, based on the pixel's coordinates in the image (this assumes that indices have been assigned to the tiles in the image and that a mapping has been established from coordinates to indices).
2. Translate the index into a reference to the tile containing the desired pixel.
3. Convert the coordinates for the pixel into tile relative coordinates.
4. Use the tile relative coordinates to find the desired pixel in the subimage represented by the tile.

Conventionally, small tiles frequently have a format similar to bitmaps, in which a pixel value can be accessed via simple array indexing. Multiple pixels can be accessed in a similar fashion. The only restriction that a tiled representation places on accessing multiple pixels is that the desired pixels must be broken up into collections of pixels that fit within individual tiles. Other methods of accessing pixels within tiles may be used, such as searching through tiles that include bounds information describing the area each tile covers within the parent image. However, the above-described description is the most conventional implementation for pixel access within a tiled image.

One reason for using image tiles is because memory resources are not sufficient to store an entire image at one time. However, at times it is desirable to have two versions of the same image. For example, if an "undo" function is desired, a first version of an image must be stored while making changes in a second version of the same image, so that the user can "undo" all actions (up to the previous undo) by simply reverting to the unchanged source image. Having a single level of "undo" requires either sufficient memory to store two versions of an image, or requires that one image be stored on a storage device while the "new" version is maintained in memory. In either case, a copying operation must be undertaken, in which data comprising the source "pre-undo" image is copied to a target image, with all the attendant data structures (including tile array) being generated for the target image. Such copying takes not only memory resources, but time, particularly with large images.

Accordingly, it would be desirable if an improved system existed for providing an easy means for "undoing" an operation on a user-perceived image, while conserving use of memory and storage. The present invention provides such a system that includes other benefits as well.

SUMMARY OF THE INVENTION

The present invention provides for a "copy on write" function for images represented as tiles such that creation of a new "target" version of an existing "source" image is performed by (1) allocating memory for a set of target image tiles corresponding to the tiles in the source image; and (2)

using a special flag associated with each of the tiles of the target image to indicate a linkage (directly or indirectly) between corresponding tiles in the source image and the target image until such time as changes are made in the target image tiles or the target image is to be finalized.

The present invention eliminates or substantially reduces the amount of copying of data required to generate a new version of an existing image, and provides for an easy means for "undoing" an operation on the user-perceived image by swapping references to internal images, while conserving the use of memory and storage.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The present invention improves upon the prior art by using tile elements more than once and in more than one image. This allows different images to share image tiles for the areas where the images are identical. Use of this concept provides a particularly effective method of providing "undo" support.

In accordance with the present invention, sharing of tile image representations is a three-stage process: setup, pixel modification, and finalization.

Setup

Figure 1:
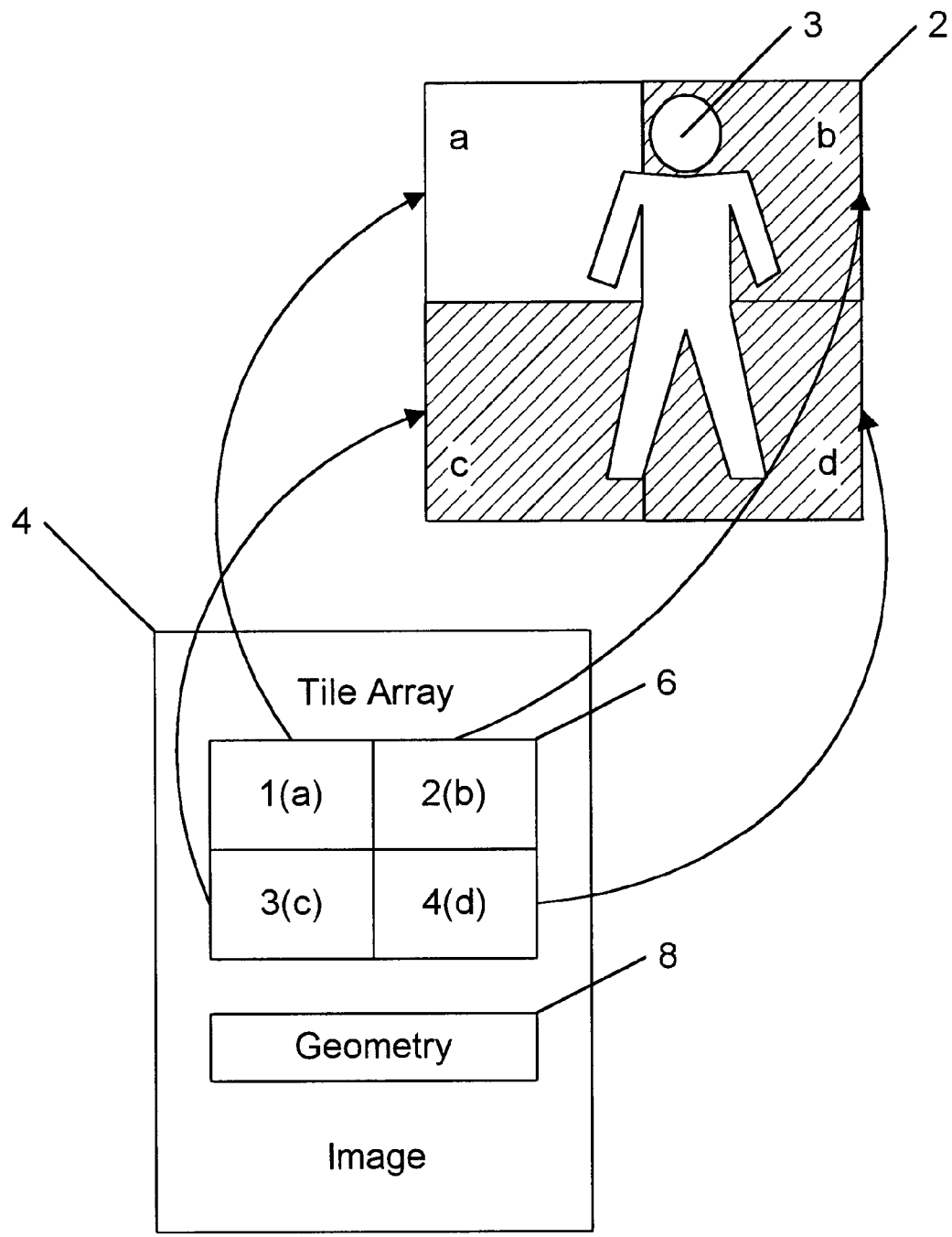
FIG. 1 is a block diagram showing a tiled image and a corresponding tile array in accordance with the prior art.
Figure 2A:
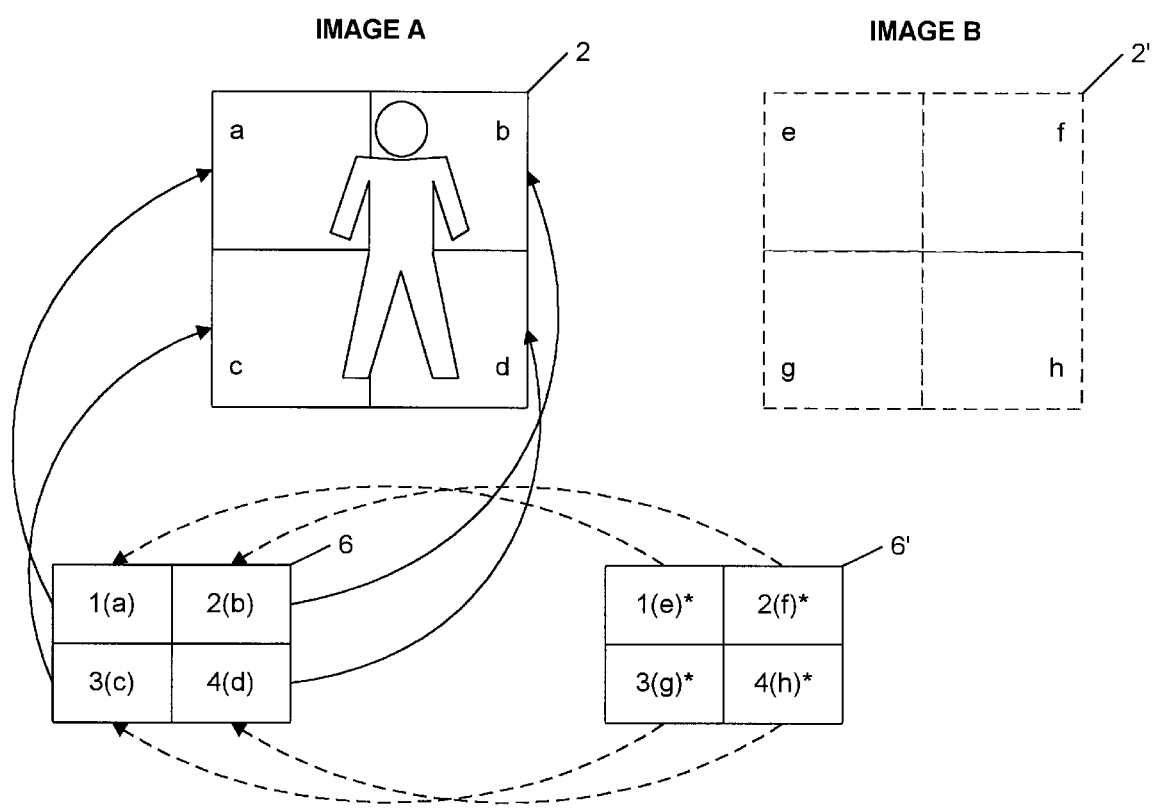
FIG. 2A is a block diagram showing initial generation of a target image from a source image in accordance with a first preferred embodiment of the present invention.

To understand the inventive process, consider in FIG. 2A, which shows an original or source image A comprising a set of image tiles 2 designated "a", "b", "c", and "d". A user desires to modify source image A. Such a modification might result, for example, from a user applying a paint stroke to image A. To do this, the system must produce a new target image B in order to be able to "undo" the modification. In general, the computer software implementing the invention will not "know" at the start of an operation which pixels are to be changed in the source image.

For purposes of describing the concepts of the invention, an image will be considered to be defined by a set of tiles 2 containing pixel data, and a tile array 6 having indexed elements containing simple pointers to corresponding tiles 2. In implementing the inventive concepts, tile IDs and tile control records would also be used in conventional fashion to manipulate and access the tiled image. Furthermore, the invention can be adapted to use other data representations of an image.

In the setup phase, memory and/or storage is allocated for a new target image B having identical tile geometry to source image A, but with its own set of image tiles 2', shown in FIG. 2A as tiles "e", "f", "g", and "h". Thus, if source image A is an N×M array of tiles having n×m pixels, target image B would have the same geometry. Note that while space is allocated for target image B, the pixels within the allocated space do not need to be initialized (although they can be initialized to some value if desired). The tiles 2' comprising target image B are bordered by dotted lines in FIG. 2A to indicate that the allocated space has not in fact been used yet.

In the preferred embodiment, in addition to allocating address space for target image B, a tile array 6' is also generated having special copy flags in accordance with the present invention. In particular, in the preferred embodiment, each element of the tile array 6' has an indicator, or "copy", flag (represented diagrammatically by an asterisk) that indicates that the flagged tile array element "copies" its value from the corresponding element of tile array 6 for the source image A (such implicit linkages are shown by dotted-line arrows in FIG. 2A). For example, element 1 of tile array 6' nominally references (directly or indirectly) tile "e" of target image B, but, by reason of the special copy flag, in fact indicates that tile "a" in image A is to be copied.

Using this system, when a pixel needs to be read from a target image that has been designated as copying from a source image, the following steps are performed:

1. First, the tile index (i.e., an element in a tile array) for the image tile containing the desired pixel and the pixel coordinates within that tile are determined as described above. However, rather than simply resolving or translating the tile array element into a tile ID, the system first looks to see whether a copy flag is associated with the tile array element.

2. If a copy flag is set for the corresponding target tile array 6' element, then the actual tile ID used is the tile ID of the corresponding element in the tile array 6 for the source image. In the example shown in FIG. 2A, if a pixel had been determined to be in tile "e" of image B, the tile ID would be resolved to "a", pointing to a tile in image A.

3. If a copy flag is not set, then the tile ID of an element in the tile array 6' of the target image is used to directly access a tile in image B.

As a result of this extra logic in the pixel access process, the system uses tiles from source image A as part of target image B when image B is drawn on a display, despite the fact that an apparently new image B was generated from image A.

Thus, if a flag is set for a tile 2' in the image array 6' for the target image B, then when the system attempts to read a pixel from that tile, it in fact accesses the image array 6 for the source image A and reads the corresponding tile in image A. If the flag is not set, then the system reads the corresponding tile in image B. This allows target image B to look to the user for display purposes like a combination of the tiles allocated for target image B and the tiles in image A. For example, at the end of setup process, all of the copy flags are set in tile array 6' and the system substitutes the tiles of image A for "virtual tiles" of image B. The user "viewing" image B at this point will not see any difference from image A, even though the tiles allocated for image B are still uninitialized.

The concept of a copy flag can be implemented in several ways. A flag per tile is needed. The options include (1)

storing flags in a separate array in the target image; (2) storing flags in the target tile array 6' along with tile IDs; (3) storing flags in the target tile control records; or (4) storing flags in the tile pixel data for the target tiles (although this is generally inefficient). Further, a copy flag can be or include an explicit pointer (direct or indirect) to an array element in the source image tile array 6, or even to a source image tile 2.

While FIG. 2A shows copy flags implicitly linking corresponding tile array elements, the invention encompasses many variations of how to find a "copied" image tile from image A. For example, the linkage followed upon noting the presence of a copy flag can be: (1) from image B to image A to image A's tile array to the image tile; (2) from image B to the tile array for image A to the image tile; (3) from image B to image B's tile array to image A's tile array to the image tile; (4) from image B to image B's tile array to the image tile; (5) from image B to image B's tile array to an image tile from B to the image tile from A; or (6) any combination of the above, including references to yet other intermediate data structures.

The key point of this aspect of the invention is that the implementing system can do the following things when accessing a pixel in target image B:

(1) as with conventional tiled images, the system can determine the index of the tile containing the pixel;

(2) as with conventional tiled images, the system can determine a tile ID for the tile allocated to image B corresponding to such index;

(3) the system can read and write a copy flag corresponding to such index;

(4) for such index, the system can determine a tile ID for the tile in image A associated with such index.

Pixel Modification

During pixel modification, the system must write a pixel within at least one tile within image B. As above, the system determines a tile index, tile ID, and a location within that tile at which to write a pixel value. The system then checks the copy flag for the index element in tile array 6'. In the preferred embodiment, if the copy flag is set, the system resolves the implicit pointer of the copy flag by indexing into the tile array 6 for image A to obtain the tile ID for the corresponding tile in image A. The system then physically copies the pixel data in that image A tile to the corresponding image tile in image B found by indexing into the tile array 6' for image B. The copy flag for the index element in tile array 6' is then cleared, and the new pixel value can be written into the corresponding tile in image B. If the copy flag was not set, new pixel values can be directly written into image B, since the corresponding element of tile array 6' already contains a tile ID directly pointing to a tile in image B.

Figure 2B:
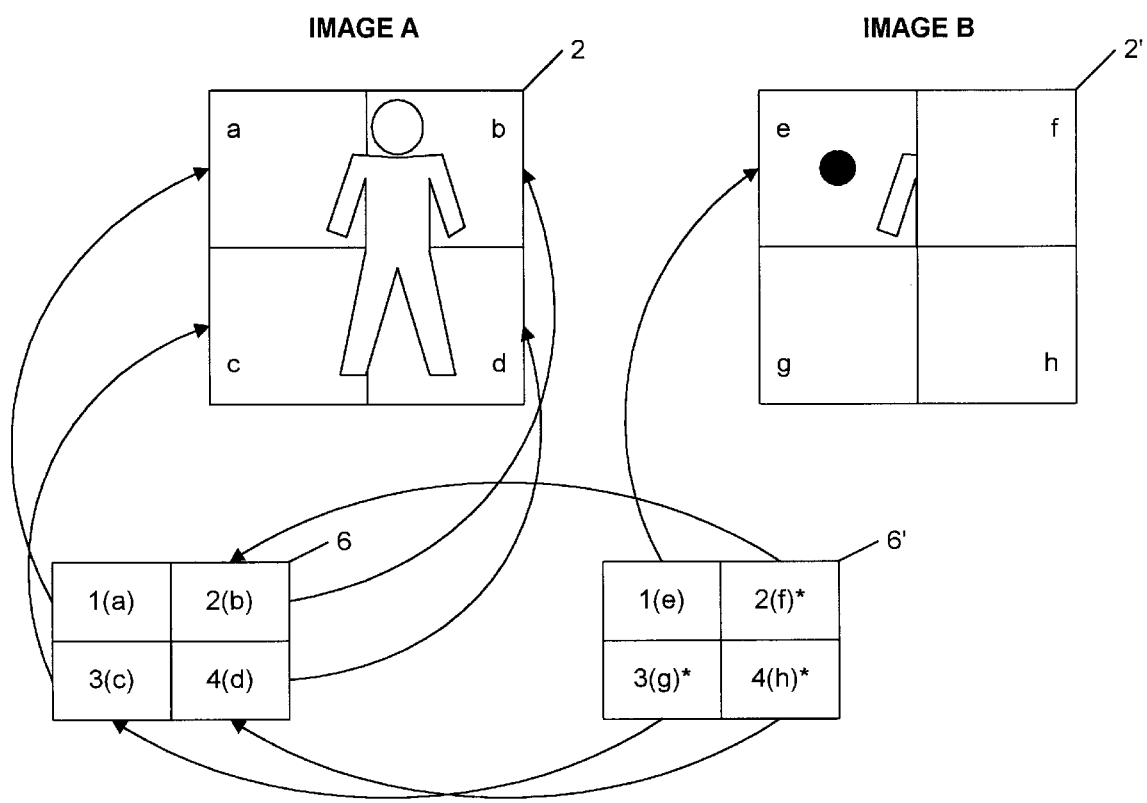
FIG. 2B is a block diagram showing the results of changing one tile of a target image in accordance with the present invention.

For example, referring to FIG. 2A, element 1 of tile array 6' nominally points to tile "e" in target image B but contains a copy flag (i.e., *). In FIG. 2B, an image element (here, a solid circle) is to be added to tile "e". Upon making a determination that tile "e" is to be modified, the copy flag indicates that tile "a" in source image A, and all of the data in tile "a", is to be copied to corresponding tile "e" of target image B. The corresponding element 1 in tile array 6' is changed to have a direct tile ID pointing to tile "e". Further modifications to tile "e" will be made directly to tile "e", since element 1 of tile array 6' no longer contains a copy flag. However, tiles "f", "g", and "h" are still implicitly defined by reference to corresponding tiles in image A, since each of the elements 2, 3, and 4 of tile array 6' contain copy flags. Image B as displayed comprises pixel data from tiles "e", "b", "c", and "d"; however, the user never knows that any part of image A is being used, or that parts of image B may still be uninitialized.

In the preferred embodiment, when a copy flag is encountered, the source tile ID to be copied is actually determined by letting the source image re-translate the pixel coordinates of interest into a tile array index and thence into a tile ID—the tile array index only exists as an intermediate value in the mapping. However, any method of establishing the correspondence between pixel coordinates and a source image tile referenced by a copy flag are within the scope of the present invention.

Finalization

Figure 2C:
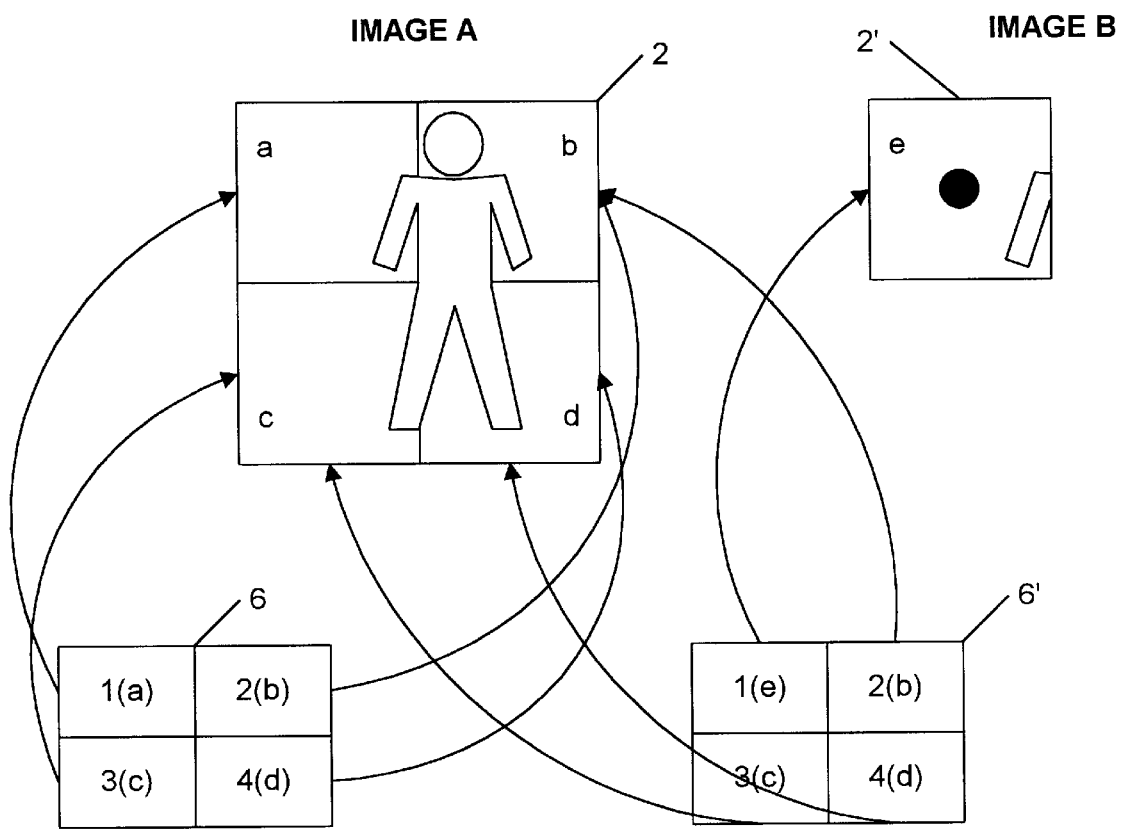
FIG. 2C is a block diagram showing a final state of the target image shown in FIGS. 2A and 2B.

The finalization process severs the link between the two images by replacing any remaining copy flagged entries in tile array 6' of image B with tile IDs for the tiles in image A and clearing the copy flags. Thus, referring to FIG. 2C, elements 2, 3, and 4 of tile array 6' will be resolved to directly contain the tile IDs stored in corresponding elements of tile array 6, as shown. Image A (tiles "a", "b", "c", and "d") and image B (tiles "e", "b", "c", and "d") now stand on their own and can be used to represent the state of the user-perceived image before and after pixel modification to image B. (Tiles "f", "g", and "h" are not shown, since that allocated storage space can now be released).

When to finalize image B is a matter of design choice. If a determination can be made as to when a operation ends (e.g., when a user ends a paint stroke), finalizing at the end of the operation is generally better in terms of "burying" the cost of updating all tiles and pointer values. On the other hand, the finalization operation can also be performed at the beginning of the next operation (that is, when image C is to be created as a modification of image B).

Once a tile is shared among multiple images, it is preferable that it be marked with a flag to indicate that it is "frozen", and cannot thereafter be changed. Any changes to the image contents on that tile must be by means of a copy of that tile. In the present invention, finalizing an image freezes the tiles in the image.

In implementing the present invention, some care should be taken with respect to releasing storage associated with an image tile. Storage should not be released that is being used for image tiles shared with other images. For example, in the first preferred embodiment, for image B, the address space allocated for tiles "f", "g", and "h" can be released after finalization. As another example, if image A is deleted, only the address space for tile "a" can be released, since the tile array 6' for image B references tiles "b", "c" and "d".

Two well-known solutions to this problem are reference counting and "garbage collection". Reference counting recovers the storage faster, while garbage collection involves less overhead in the process of creating and finalizing images.

Extensions of the Invention

Using the above system, the target image B can be restored to exactly match the source image A quite readily simply be remarking all of the tile array elements of image B with copy flags. Access to an element in the tile array 6' for image B will then cause the system to access the corresponding element in the tile array 6 for image A. Similarly, smaller regions in image B can be restored to match the source image A. For example, for any tiles completely contained within the area to be restored, a copy flag is re-set in the corresponding elements of the tile array 6'. For any tiles not completely contained within the area but for which the copy flag is set (indicating that those tile array elements already point to the source image A), nothing need be done. For the remaining areas, the pixel data is copied from the source image A to the target image B. The ability to selectively and quickly restore regions is useful in operations where the source image is repeatedly combined with data that changes over time. For example, when building up a paint stroke, it may be desirable or necessary to reset the target image to match the source image and then recomposite in an expanded paint stroke. (For this functionality, the implementing system must only clear copy flags rather than destroy the data structures that create the correspondence between tile array elements of a target image and the tiles of a source image.)

In a further extension of the invention, if an image is known to be constant (e.g., a new blank image has just been created), then a single image tile can be repeatedly referred to by each tile array entry for the image. Put another way, a single image can reference an image tile multiple times. If such a function is used frequently, the implementing program can be optimized even more by having a special copy flag for the image as a whole that indicates that every tile of the image maps to a single image tile. Thus, images which map all pixels in an image to a single image tile may be implemented via a compressed tile array that only stores one tile ID.

As another extension of the invention, an area of the target image B can be set to a constant value readily without copying pixel data from image A simply by resetting the copy flag to "do not copy" or "false" for all tiles completely contained within the area, since all pixels within those tiles will be overwritten by the constant value.

As yet another extension of the invention, if the limits on changes to a target image are known before a change begins, tiles can be shared between the target image and source image without the need for using copy flags, simply by directly associating the pertinent tile array elements for the target image with the tile IDs of the source image upon allocating address space for the target image. For example, it might be known beforehand, because of a selection mask, that a change will only be made to the tiles in the left-hand column in image A of FIG. 2A (that is, tiles "a" and "c"). Hence, during the allocation stage for image B, the tile array entries for what would have been tiles "f" and "h" can instead be "finalized" to reference tiles "b" and "d" directly, in a manner similar to that shown in FIG. 2C. This feature reduces the storage that needs to be allocated for the target image.

Shared tiles in pyramidal images

In many implementations of image manipulation software, a program works with "image pyramids". Image pyramids are image representations in which image data is stored at multiple resolutions. For example, a base image may comprise 1024×1024 pixels, divided into 16 tiles each 256 pixels on a side. An intermediate level of resolution may comprise 4 tiles, each 256 pixels on a side, each such tile comprising a coarser representation of the 4 base tiles immediately below. A top level may comprise a single 256×256 pixel tile representing an even coarser version of the 4 intermediate level tiles below it.

When using the present invention with pyramidal images, a number of adjustments should be made. For example, in upper image levels, pixel data can be changed in an image tile after the tile has been "frozen". This can happen, for example, if the pixel data for such upper level tile is incrementally calculated. The basic point of freezing, however, remains the same: the pixel data in an upper level image tile is fully determined at the time of freezing, although it may have not yet been calculated from lower level tiles.

When finalizing a tile in the upper image levels of the target image, a determination must be made as to whether to use the corresponding image tile from the source image. The issue is whether the pixel data for the two images at that level in that tile is the same. Since the pixel data in one level of an image pyramid depends exclusively on the pixel data in some lower level (generally, the previous level), and this data for specific tiles depends on a limited area in that lower level, the issue can be rephrased as asking whether the tiles overlapping that source area for the down-sampling necessary to generate the upper level tile are shared between the two images. This approach may inhibit sharing more often than is absolutely necessary, but it will perform reasonably well. Slightly better performance can be obtained by observing that the data for any pixel in the upper levels of the image pyramid generally depends on some specific set of pixels in the base level. Thus, the system can check to see whether the tiles in the base areas of a source image and a target image are shared in order to determine whether to share an upper level tile.

Implementation

The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for sharing image tiles of a source image, each image tile being referenced, directly or indirectly, by a corresponding element of a source tile array, with a target image, comprising the steps of:

(a) allocating address space within a computer system for image tiles of the target image;

(b) generating a target tile array within the computer system having elements referencing, directly or indirectly, corresponding image tiles in the target image;

(c) initially setting a flag associated with each element of the target tile array to indicate an implicit reference, directly or indirectly, to a corresponding image tile in the source image;

(d) accessing a corresponding image tile of the source image when the flag associated with an accessed element of the target tile array is set;

(e) if a change is to be made to an image tile of the target image, and the flag associated with the corresponding element in the target tile array is set, then:
   (1) accessing the image tile of the source image corresponding to the flagged element and copying such accessed image tile to a corresponding image tile address space of the target image, and
   (2) clearing the flag of the flagged element; and (f) accessing an image tile of the target image when a corresponding accessed element of the target tile array is not flagged.

2. The method of claim 1, further including the step of:
(a) finalizing the target image by generating a reference for each flagged element of the target tile array to the corresponding image tile in the source image.

3. The method of claim 1, further including the step of:
(a) re-setting the flag associated with an element of the target tile array to indicate an implicit reference, directly or indirectly, to a corresponding image tile in the source image, thereby removing changes to the corresponding image tile of the target image.

4. A system for sharing image tiles of a source image, each image tile being referenced, directly or indirectly, by a corresponding element of a source tile array, with a target image, comprising:

(a) means for allocating address space within a computer system for image tiles of the target image;

(b) means for generating a target tile array within the computer system having elements referencing, directly or indirectly, corresponding image tiles in the target image;

(c) means for initially setting a flag associated with each element of the target tile array to indicate an implicit reference, directly or indirectly, to a corresponding image tile in the source image;

(d) means for accessing a corresponding image tile of the source image when the flag associated with an accessed element of the target tile array is set;

(e) means, if a change is to be made to an image tile of the target image, and the flag associated with the corresponding element in the target tile array is set:
   (1) for accessing the image tile of the source image corresponding to the flagged element and copying such accessed image tile to a corresponding image tile address space of the target image, and
   (2) for clearing the flag of the flagged element; and (f) means for accessing an image tile of the target image when a corresponding accessed element of the target tile array is not flagged.

5. The system of claim 4, further including:
(a) means for finalizing the target image by generating a reference for each flagged element of the target tile array to the corresponding image tile in the source image.

6. The system of claim 4, further including:
(a) means for re-setting the flag associated with an element of the target tile array to indicate an implicit reference, directly or indirectly, to a corresponding image tile in the source image, thereby removing changes to the corresponding image tile of the target image.

7. A computer program, residing on a computer-readable medium, for sharing image tiles of a source image, each image tile being referenced, directly or indirectly, by a corresponding element of a source tile array, with a target image, the computer program comprising instructions for causing a computer to:

(a) allocate address space within a computer system for image tiles of the target image;

(b) generate a target tile array within the computer system having elements referencing, directly or indirectly, corresponding image tiles in the target image;

(c) initially set a flag associated with each element of the target tile array to indicate an implicit reference, directly or indirectly, to a corresponding image tile in the source image;

(d) access a corresponding image tile of the source image when the flag associated with an accessed element of the target tile array is set;

(e) if a change is to be made to an image tile of the target image, and the flag associated with the corresponding element in the target tile array is set, then:
   (1) access the image tile of the source image corresponding to the flagged element and copying such accessed image tile to a corresponding image tile address space of the target image, and
   (2) clear the flag of the flagged element; and (f) access an image tile of the target image when a corresponding accessed element of the target tile array is not flagged.

8. The computer program of claim 7, further comprising instructions for causing a computer to:
(a) finalize the target image by generating a reference for each flagged element of the target tile array to the corresponding image tile in the source image.

9. The computer program of claim 7, further comprising instructions for causing a computer to:
(a) re-set the flag associated with an element of the target tile array to indicate an implicit reference, directly or indirectly, to a corresponding image tile in the source image, thereby removing changes to the corresponding image tile of the target image.

* * * * *